United States Patent
Kumar et al.

(10) Patent No.: US 7,606,149 B2
(45) Date of Patent: Oct. 20, 2009

(54) METHOD AND SYSTEM FOR ALERT THROTTLING IN MEDIA QUALITY MONITORING

(75) Inventors: Rajesh Kumar, Palo Alto, CA (US); Randall P. J. Ethier, Burke, VA (US); Chelliah Sivachelvan, Carrollton, TX (US); Robert J. Biskner, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 333 days.

(21) Appl. No.: 11/379,312

(22) Filed: Apr. 19, 2006

(65) Prior Publication Data

US 2007/0248022 A1    Oct. 25, 2007

(51) Int. Cl.
*G01R 31/08* (2006.01)
*H04J 1/16* (2006.01)
*H04L 1/00* (2006.01)

(52) U.S. Cl. ............... 370/229; 370/236.2; 370/241.1; 370/252; 370/325; 370/353; 370/354; 370/355; 370/356; 370/468; 370/230; 370/231; 370/235; 455/452.1; 455/453; 455/518; 455/519; 455/520

(58) Field of Classification Search ............. None
See application file for complete search history.

(56) References Cited

U.S. PATENT DOCUMENTS

| | | | |
|---|---|---|---|
| 6,442,706 B1 * | 8/2002 | Wahl et al. ............ 714/6 |
| 6,681,232 B1 | 1/2004 | Sistanizadah et al. | |
| 6,801,940 B1 | 10/2004 | Moran et al. | |
| 6,975,876 B1 | 12/2005 | Cast et al. | |
| 6,985,901 B1 | 1/2006 | Sachse et al. | |
| 7,043,237 B2 | 5/2006 | Snyder et al. | |
| 7,051,098 B2 | 5/2006 | Masters et al. | |
| 2005/0138111 A1 * | 6/2005 | Aton et al. ............ 709/201 |

OTHER PUBLICATIONS

SNMP Commands, http://cisco.com/univercd/cc/td/doc/product/mels/15530/command/her_snmp.htm, pp. 1-11, Apr. 19, 2006.
S. Chisholm et al., Network Working Group, "Alarm Management Information Base (MIB)," http://www.ietf.org/rfc/rfc3877.txt?number=3877, pp. 1-71, 2004.

(Continued)

*Primary Examiner*—Raj K Jain
(74) *Attorney, Agent, or Firm*—Baker Botts L.L.P.

(57) ABSTRACT

A method for alert throttling in media quality monitoring, includes monitoring a plurality of active communication sessions. Each active communication session is between at least two endpoints. The method also includes detecting at least one quality-impacted communication session out of the plurality of active communication sessions. The method also includes generating a first alert for each detected quality-impacted communication session out of the plurality of active communication sessions until a first throttling number of quality-impacted communication sessions is detected out of the plurality of active communication sessions. Upon detecting the first throttling number of quality-impacted communication sessions, the method includes generating a second alert for each group of additional second number of quality-impacted communication sessions detected out of the plurality of active communication sessions.

19 Claims, 2 Drawing Sheets

OTHER PUBLICATIONS

T. Friedman et al., Network Working Group, "RTP Control Protocol Extended Reports (RTCP XR)," http://www.rfc-editor.org/rfc/rfc3611.txt, pp. 1-52, 2003.

H. Schulzrinne, Network Working Group, "RTP: A Transport Protocol for Real-Time Applications," http://www.ietf.org/rfc/rfc3550.txt, pp. 1-98, 2003.

U.S. Appl. No. 11/419,913, filed May 23, 2006, entitled "Method and System for Adaptive Media Quality Monitoring," 47 pages specification, claims and abstract, 2 pages of drawings, inventors Ethier et al.

* cited by examiner

METHOD AND SYSTEM FOR ALERT THROTTLING IN MEDIA QUALITY MONITORING

TECHNICAL FIELD OF THE INVENTION

This invention relates generally to communications systems and, more particularly, to a method and system for alert throttling in media quality monitoring.

BACKGROUND

As the internet continues to grow in popularity and pervasiveness so do the products and services that use it. The large number of internet users spread throughout the world and the wide variety of hardware components and software used therein presents numerous opportunities for the media streams to become impaired. Such impairments may include a low signal level, a high noise level, or a low mean opinion score. The impairments may, for example, be caused by packet loss between the two endpoints, excessive traffic at any of the components between the two endpoints, endpoints out of sync with each other, or incompatible hardware or software between the two endpoints or other components. The possibility of media degradation has caused some users to be hesitant about switching from traditional products or services to products or services that use internet protocol (IP).

To help ensure the quality of the products and services enabled by the internet, some products and services include diagnostic capabilities that may report the quality of the service. More specifically, nodes that support internet protocol communication sessions may monitor the media quality of these sessions and send reports when critical metrics exceed certain thresholds (in instances where the quality of the communication session is degraded but not terminated). However, in the event of a network component failure generating a high volume of diagnostic reports may exacerbate rather than help the situation. Furthermore, the large number of reports may provide an information overload, when what is desired is to know what the problem is and to have an assessment of the overall impact of the problem.

To help protect against this some products provide for a minimum spacing between reports to help alleviate the additional strain caused by generating a report for every call. Unfortunately this may cause the loss of detailed information for some calls and, in some instances, only postpones sending the same amount of information (e.g. five separate reports sent out over a period of time instead of immediately one after the other). Furthermore, in nodes that support a large number of communication sessions, a large scale problem may still generate a large number of reports that are more of a hindrance than a help.

SUMMARY

In accordance with the present invention, a method and system for alert throttling in media quality monitoring is provided which substantially eliminates or reduces the disadvantages and problems associated with previous systems and methods.

In accordance with a particular embodiment of the present invention, a method for alert throttling in media quality monitoring includes monitoring a plurality of active communication sessions. Each active communication session is between at least two endpoints. The method also includes detecting at least one quality-impacted communication session out of the plurality of active communication sessions. The method also includes generating a first alert for each detected quality-impacted communication session out of the plurality of active communication sessions until a first throttling number of quality-impacted communication sessions is detected out of the plurality of active communication sessions. Upon detecting the first throttling number of quality-impacted communication sessions, the method includes generating a second alert for each group of additional second number of quality-impacted communication sessions detected out of the plurality of active communication sessions.

Where the method includes generating a second alert for each group of additional second number of quality-impacted communication sessions detected the method may also include generating a second alert for each group of additional second number of quality-impacted communication sessions detected until a second throttling number of quality-impacted communication sessions is detected out of the plurality of active communication sessions. The method may also include, upon detecting the second throttling number of quality-impacted communication sessions out of the plurality of active communication sessions, generating a third alert for each group of additional third number of quality-impacted communication sessions detected out of the plurality of active communication sessions.

Where the method includes generating a first alert the method may include performing a consequent action or generating a report comprising session-specific details of the at least one quality-impacted communication session. Where the method includes generating a second alert the method may include performing an aggregate consequent action or generating a report comprising aggregate details of the second number of quality-impacted communication sessions.

The method may also include, after generating second alerts for each group of additional second number of quality-impacted communication sessions detected, generating a first alert for each detected quality-impacted communication session out of the plurality of active communication sessions when a number of quality-impacted communication sessions detected out of the plurality of active communication sessions is equal to or less than a hysteresis number, the hysteresis number less than the first throttling number.

In accordance with another embodiment of the present invention, a system for alert throttling in media quality monitoring includes an interface operable to monitor a plurality of active communication sessions. Each active communication session is between at least two endpoints. The interface is also operable to detect at least one quality-impacted communication session out of the plurality of active communication sessions. The system also includes a processor coupled to the interface and operable to generate a first alert for each detected quality-impacted communication session out of the plurality of communication sessions until a first throttling number of quality-impacted communication sessions is detected out of the plurality of active communication sessions. Upon detecting the first throttling number of quality-impacted communication sessions, the processor is operable to generate a second alert for each group of additional second number of quality-impacted communication sessions detected out of the plurality of active communication sessions.

Technical advantages of particular embodiments of the present invention include media quality monitoring that adapts to the number of quality-impacted calls by reducing the number, size and/or frequency with which alerts are generated as the number of quality-impacted calls increases. For example, per-call metric reports and/or consequent actions may be generated until a specific number of quality-impacted calls is detected. When the specific number of quality-impacted calls is detected the metric reports and consequent actions may be aggregated. Accordingly, resources are conserved and technicians are presented with information that more closely matches the problem. If there is a relatively small number of quality-impacted calls the technician may be more interested in call specific details, but if there is a relatively large number of quality impacted calls the technician may be more interested in general network information (e.g. technician may find little value in knowing when the 5001th call is quality-impacted if he already knows that 5000 calls are quality-impacted).

Another technical advantage includes terminating or changing consequent actions, normally initiated upon each quality-impacted call, when a number of quality-impacted calls exceeds a predetermined throttling threshold. Accordingly, resources may be conserved for the calls themselves. Another technical advantage of some embodiments is the use of hysteresis to delay returning to a lower throttling level of alerts after being within a higher throttling level. Accordingly, the system may avoid bouncing back-and-forth between two throttling levels when the detected number of quality-impacted calls is near the border between two throttling levels.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
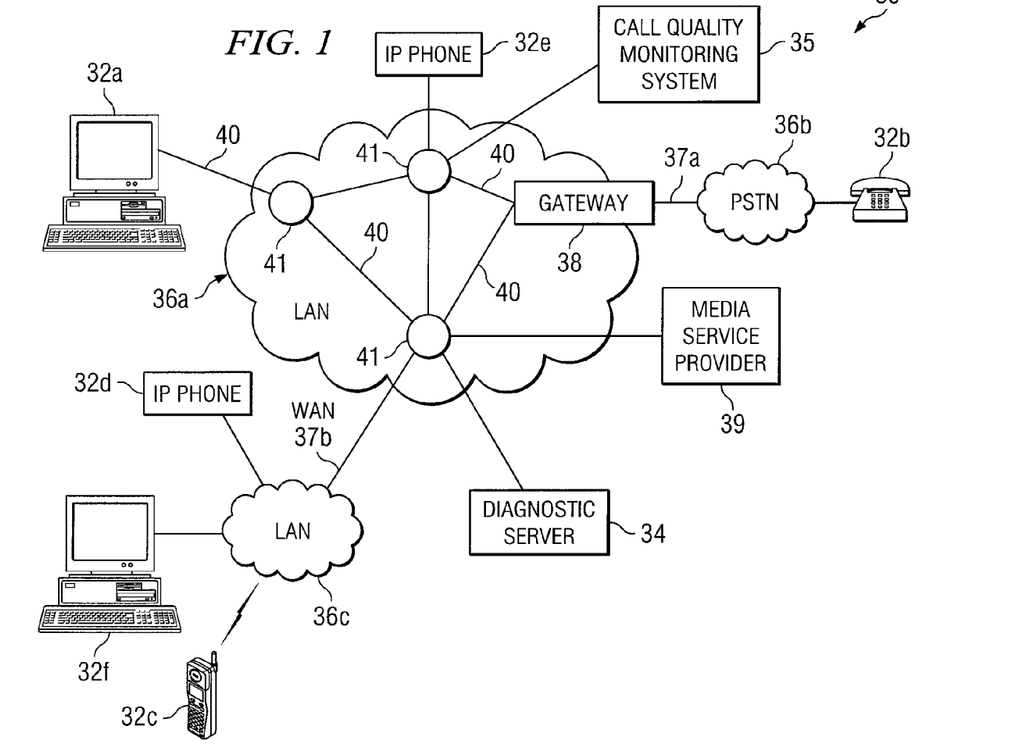
FIG. 1 illustrates a communication system including a plurality of endpoints operable to communicate among each other using internet protocol, in accordance with a particular embodiment of the present invention.

FIG. 1 illustrates a communication system 30 including a plurality of endpoints 32a-32f having the ability to establish calls between each other using one or more of communication networks 36a-36c. Communication system 30 also includes call quality monitoring system (CQMS) 35, media service provider (MSP) 39 and diagnostic server 34. Endpoints 32a-32f and CQMS 35 may have the ability to communicate diagnostic information between each other, MSP 39 and/or diagnostic server 34.

The diagnostic information may include metric reports containing information concerning various aspects of a call between two endpoints. The metric report may be based on one or more particular metrics that may have been used to monitor, record, compare, rate or otherwise analyze a specific feature(s) of the call. The metric report may be transmitted at the end of each call, at some point during the call (e.g. a predetermined time after the call is initiated or upon the occurrence of a specific event) or periodically during the life of the call.

Calls shall include the sending or receiving of any type of media transmitted using any audio and/or video means, including signals, data or messages transmitted through any suitable technology, such as voice devices, text chat, web sessions, facsimile, on-line gaming, instant messaging and e-mail. Furthermore, a call may be used interchangeably with a communication session.

Within a particular communication network various metrics may be used to detect quality-impacted calls. The detection of quality-impacted calls may trigger generating alerts, such as generating metric reports or initiating consequent actions. These alerts may present an increasing burden on a communication network's resources if the detected number of quality-impacted calls increases. When this happens some embodiments of the present invention allow throttling that may reduce the amount of resources needed by endpoints, CQMSs and/or networks to generate, communicate and/or process alerts. For example, the throttling may include one or more of the following: (1) reducing the number of alerts that are generated by aggregating several calls within each alert, (2) reducing the amount of call-specific detail in each metric report, (3) stopping the consequent actions, and (4) changing the consequent action. If, for example, endpoint 32 or CQMS 35 has detected a relatively small number of quality impacted calls there may be a metric report generated and a consequent action initiated for each quality-impacted call. If, on the other hand, enpoint 32 or CQMS 35 has detected a relatively large number of quality-impacted calls then a single metric report summarizing the quality-impacted calls may be generated and the consequent actions may be stopped.

In the illustrated embodiment, communication network 36a is a local area network (LAN) that enables calls between a plurality of endpoints 32a-32f and communications (e.g. signaling) between endpoints 32, diagnostic server 34, CQMS 35, and/or MSP 39. The LAN can be distributed across multiple cities and geographic regions, and may be referred to as a metro LAN or a wide area network (WAN). Communication network 36b is a public switched telephone network (PSTN) and couples endpoint 32b with communication network 36a through gateway 38. Communication network 36c is another LAN, which couples endpoints 32c, 32d, and 32f with communication network 36a. Accordingly, users of endpoints 32a-32f, may establish calls between and among each network component coupled for communication with one or more of networks 36a-36c. Communication links 37a and 37b couple communication networks 36a and 36b, and communication networks 36a and 36c, respectively. In the illustrated embodiment, communication link 37b is a WAN, which couples LANs 36a and 36c.

In the illustrated embodiment, communication system 30 includes MSP 39 that facilitates calls among users based on the service provided by MSP 39. For example, MSP 39 may facilitate a voice over internet protocol (VoIP) call between endpoints 32a and 32c. In particular embodiments MSP 39 may provide: (1) a VoIP service, (2) a video over IP service, (3) an on-line gaming service, or (4) any other functionality typically provided by MSPs in communication systems. In some embodiments MSP 39 may include a media server that may itself function as an automated endpoint. For example, MSP 39 may include a media server that stores voicemail messages for users of MSP 39.

Communication system 30 may also include diagnostic server 34. Diagnostic server 34 may be used for storing and/or indexing diagnostic logs of the diagnostic information sent by, for example, endpoints 32 or CQMS 35. The logs may be retrieved from diagnostic server 34 through, for example a network technician using a PC. In doing so he may, in some instances, use a graphical user interface (GUI) that allows him to interact with the diagnostic server.

In some embodiments CQMS 35 may be integrated within or part of an endpoint. In some embodiments, CQMS 35 may be functionally located between endpoints such that it may monitor the quality of calls between the endpoints. For example, CQMS 35 may be part of a sniffer, or an edgepoint, or it may be a standalone device. Regardless of where CQMS 35 is located, it may monitor the call quality of a call between the same type of endpoints, such as between two IP phones 32*a* and 32*f*, or between different types of endpoints, such as IP phone 32*e* and PSTN phone 32*b*.

As mentioned above CQMS 35 may be a standalone device or it may be incorporated within any of a variety of different components within a communication network, such as an endpoint or a sessions border controller. Regardless of where CQMS 35 is physically located, it may still be capable of generating call specific or aggregate alerts. Generating an alert may include collecting and processing data from a specific metric to create a metric report or determine an appropriate consequent action. The metric reports may, for example, be used by MSP 39 in determining billing rates for its customers or in troubleshooting problems with the service they are providing. The consequent action may attempt to provide additional diagnostic information and/or to correct the quality impairment.

Communication network 36*a* includes a plurality of segments 40 and nodes 41 that couple endpoints 32*a* and 32*e* with gateway 38 and communication networks 36*b*-36*c*. Therefore, a user of endpoint 32*a* is provided with access to endpoints 32*b*-32*f*. Furthermore, endpoints 32*a*-32*f*, diagnostic server 34, CQMS 35 and MSP 39 may all communicate control and data signals among each other. Nodes 41 may include any combination of network components, session border controllers, gatekeepers, call managers, conference bridges, routers, hubs, switches, gateways, endpoints, edgepoints, or any other hardware, software, or embedded logic implementing any number of communication protocols that allow for the exchange of packets in communication system 30.

Communication system 30 may also include a plurality of edgepoints. An edgepoint may be a real-time transfer protocol (RTP) media relay point that may be incorporated within one or more of the devices or components depicted in FIG. 1. For example, if nodes 41 were IP to IP gateways, then any of nodes 41 may include an edgepoint. An edgepoint may also be included in any other network component or device that may, in effect, define a boundary for a particular network, such as network 36*a*. Some other possible devices that may incorporate an edgepoint include a session border controller and a policy execution point. The use of an edgepoint may aid a network administrator in ascertaining the contribution of his network to any impairments a call may experience.

Although the illustrated embodiment includes three communication networks 36*a*-36*c*, the term "communication network" should be interpreted as generally defining any network capable of transmitting audio and/or video telecommunication signals, data, and/or messages, including signals, data or messages transmitted through text chat, instant messaging and e-mail. Any one of networks 36*a*-36*c* may be implemented as a local area network (LAN), wide area network (WAN), global distributed network such as the Internet, Intranet, Extranet, or any other form of wireless or wireline communication network. In addition, communication networks in accordance with various embodiments may include any number of MSPs 39, CQMSs 35, or diagnostic servers 34. Generally, network 36*a* provides for the communication of packets, cells, frames, or other portions of information (generally referred to as packets herein) between endpoints 32*a*-32*f*, diagnostic server 34, CQMS 35 and MSP 39 as part of media quality monitoring. Communication network 36*a* may include any number and combination of segments 40, nodes 41, endpoints 32*a*-32*f*, MSPs 39 or diagnostic servers 34.

In a particular embodiment, communication network 36*a* employs voice communication protocols that allow for the addressing or identification of endpoints, nodes, and/or CQMSs coupled to communication network 36*a*. For example, using Internet protocol (IP), each of the components coupled together by communication network 36*a* in communication system 30 may be identified in information directed using IP addresses. In this manner, network 36*a* may support any form and/or combination of point-to-point, multicast, unicast, or other techniques for exchanging media packets among components in communication system 30. Any network components capable of exchanging audio, video, or other data using frames or packets are included within the scope of the present invention.

Network 36*a* may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36*a* may also be coupled to non-IP telecommunication networks through the use of interfaces or components, for example gateway 38. In the illustrated embodiment, communication network 36*a* is coupled with PSTN 36*b* through gateway 38. PSTN 36*b* includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36*b*), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoints 32*a* and 32*c*-32*f*, diagnostic server 34, CQMS 35, MSP 39, and gateway 38 may include IP telephony capabilities allowing them to participate in and/or monitor audio, video, and other multimedia communication sessions. IP telephony devices have the ability to encapsulate a user's voice (or other input) into IP packets so that the voice can be transmitted over network 36*a*. IP telephony devices may include telephones, fax machines, computers running telephony software, nodes, gateways, wired or wireless devices, hand held PDAs, or any other device capable of performing telephony functions over an IP network.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32*a*-32*f*, diagnostic server 34, CQMS 35, MSP 39 and/or gateway 38 may be any combination of hardware, software, and/or encoded logic that provides communication services to a user. For example, endpoints 32a-32f may include a telephone, a computer running telephony software, a video monitor, a camera, an IP phone, a cell phone or any other communication hardware, software and/or encoded logic that supports the communication of packets of media (or frames) using communication network 36a. Endpoints 32a-32f may also include unattended or automated systems, gateways, other intermediate components or other devices that can establish calls. Although FIG. 1 illustrates a particular number and configuration of endpoints, segments, nodes, and gateways, communication system 30 contemplates any number or arrangement of such components for communicating media. In addition, elements of communication system 30, such as CQMS 35, may include components centrally located (local) with respect to one another or distributed throughout communication system 30.

Figure 2:
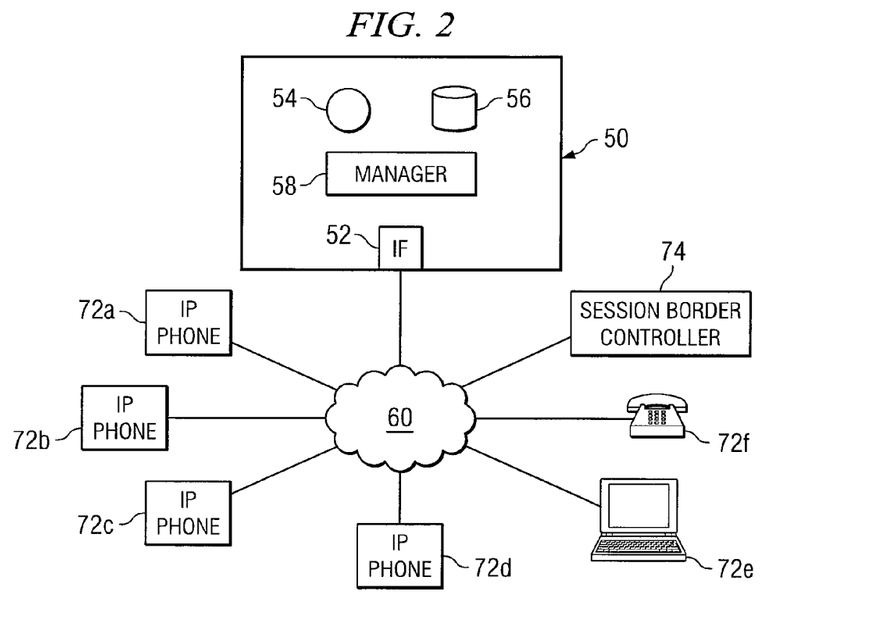
FIG. 2 illustrates a call quality monitoring system, illustrating aspects of the present invention.

FIG. 2 illustrates a call quality monitoring system, illustrating aspects of the present invention. In the depicted embodiment call quality monitoring system (CQMS) 50 is depicted as a component separate from endpoints 72a-72f; it should be noted that in particular embodiments the functionality described with respect to CQMS 50 may be incorporated within one or more of endpoints 72a-72f or CQMS 50 may be a component of a larger system, such as a billing system of a service provider or a session border controller. In the illustrated embodiment, CQMS 50 includes interface 52, processor 54, memory module 56, and manager 58.

Network 60 may be similar to any of networks 36 from FIG. 1. Network 60 couples endpoints 72a-72f, session border controller 74 and CQMS 50. Network 60 may comprise several different components including, but not limited to, media gateways and media servers. Furthermore, network 60 may comprise more than one network.

Interface 52 couples CQMS 50 with communication network 60 and may be operable to send and receive metric reports and/or control signals to and from endpoints 72a-72f via network 60. Processor 54 may be a microprocessor, controller, or any other suitable computing device, resource, or combination of hardware, software, logic embodied in a computer readable medium, and/or encoded logic. Processor 54 may execute various responses according to its analysis of the quality of the call and/or the quality of other calls as described herein with respect to particular embodiments. Memory module 56 may be any form of volatile or non-volatile memory including, without limitation, magnetic media, optical media, random access memory (RAM), read-only memory (ROM), removable media, or any other suitable local or remote memory component. Memory module 56 may store any suitable information to implement features of various embodiments, such as the parameters of particular media metrics.

Manager 58 may maintain a listing, table, database or any other desired organization of information about endpoints 32 or calls facilitated by communication system 60 and/or any metrics associated therewith. More specifically, the information may include which metrics are currently active for a particular endpoint or call, the current rate at which metric reports are being generated, where various metric reports are being sent and what is being done with the metric reports. Manager 58 may also control the throttling of alerts. Manager 58 may comprise any combination of hardware, software, and/or encoded logic.

Endpoints 72a-72f may be similar to one or more of endpoints 32 described above with respect to FIG. 1. More specifically, depicted in FIG. 2 are IP phones 72a-72d, PC 72e and telephone 72f, where PC 72e may be a personal computer running telephony software enabling it to communicate using, for example, VoIP technology and telephone 72f may be a typical PSTN phone. As mentioned above, adapting the media quality monitoring as described herein may be performed by an endpoint capable of monitoring the media quality such as IP phones 72a-72d and PC 72e as well as by other components within network 60.

Session border controller 74 may functionally be located between communication network 60 and other communication networks. Session border controller 74 may comprise an edgepoint that may aid a network administrator in ascertaining the contribution of his network to any impairments a call may experience. Because the session border controller may house an edgepoint it may monitor communications coming into and leaving communication network 60. The quality of the two flows of communications may be used to help determine where the cause of the impairment is located (e.g. whether the impairment is within communication network 60 or without).

As indicated above, particular embodiments provide for adapting the extent that the quality of a call may be monitored and/or reported. One way that the quality of a call may be monitored is through the use of metrics. Metrics may be used in monitoring any of a number of different aspects of a call, such as the media quality of the call, the amount and/or frequency of packet loss during the call, the signal level and/or noise level of the call or any other aspect of the call that may be deemed important. It should be noted that it is not intended that the present invention be limited in any way to only the use of those metrics set forth herein, rather the present invention contemplates the use of any suitable metric. As discussed above, a call may be quality-impacted if a characteristic monitored by a metric exceeds a predetermined threshold.

Detecting a quality-impacted call may cause an alert to be generated. In some embodiments the alert may include a metric report. The metric report may be generated based on information that has been monitored and possibly analyzed, sorted or rated via a metric. The metric report may be sent at the end of a call, at some point during the call, or periodically throughout the call. Some metric reports may be generated for every call, while some metric reports may be generated for some calls, for example those calls that are quality-impacted. If the detected number of quality-impacted calls is above a predetermined threshold, processor 54 may begin to aggregate the metric reports. Aggregated metric reports may include, in one aggregate report, information from several calls, such as the average, maximum or minimum values of critical parameters.

In some embodiments the alert may include a consequent action. The consequent action may be designed to improve the quality of the current call, minimize or correct the impairment of subsequent calls, and/or provide additional diagnostic information. The consequent action may be any of a variety of different actions such as adjusting an aspect of the current call, adjusting an aspect of other calls, adjusting an aspect of the network facilitating the call, monitoring additional metrics for other calls, generating reports for other calls, or initiating other diagnostic features for this call or other calls. More specifically, some of the consequent actions may include initiating a trace route, changing the codec type, changing the frame size, or changing the packetization period. As an example, in some embodiments, in response to detecting a quality-impacted call CQMS 50 may initiate a trace route to determine the routing of packets for the call.

It should be recognized that every alert that is generated may involve using the resources of one or more of the network, the endpoint, or other components connected to the network (e.g. an edgepoint). This could cause scalability problems for any of those components. At some point the number of metric reports and consequent actions may be more of a burden on the network and/or component than they are a benefit to a technician.

When network 60, and the calls it facilitates, are functioning properly there may be a relatively small number of quality-impacted calls detected. In such instances, if, for example, a quality-impacted call between endpoints 72a and 72b is detected by CQMS 50, CQMS 50 may generate an alert. The alert may comprise a metric report containing information based on a particular metric that may be specific to the call between endpoints 72a and 72b. The alert may also comprise a call specific consequent action, such as layer 3 trace route. However, if the number of quality-impacted calls is above a specified throttling threshold, a level of throttling may be applied. Some embodiments may have multiple throttling levels separated by different throttling thresholds; each throttling level may provide a different degree of throttling. When throttling is applied, whether by an endpoint (e.g. endpoints 72a-72e), CQMS 50 or any other component that may be connected to communication network 60, the alerts may no longer be based on individual calls, rather the alerts may be based on several calls. Furthermore, in some embodiments the throttling may also change the type of alert that is generated (e.g. instead of initiating a layer 3 trace route, CQMS 50 may start monitoring different metrics). The number of calls that are used in each alert depends on the number of quality impacted calls that are detected, which in turn determines the particular throttling level. More particularly, as the number of quality-impacted calls increases and triggers subsequent throttling levels, each subsequent throttling level may include more calls in each alert than the previous throttling level (thereby reducing the number of alerts that may be generated).

The throttling provides several benefits to both communication network 60 and a technician that may be servicing communication network 60. As the number of quality-impacted calls increases so does the number of alerts that are generated. This further strains communication network 60 whose resources may already be overly used (e.g. if several calls are quality-impacted there may be something wrong with a component of the communication network which may cause other components to have to pick up the slack). In some embodiments, as the detected number of quality-impacted calls increases, manager 58 may employ throttling to reduce the size and number of metric reports that are sent and to stop initiating consequent actions. The throttling thus reduces the strain on system resources by reducing the amount of resources needed to generate, transmit and store metric reports and initiate consequent actions. Furthermore, where many endpoints are experiencing the same quality impairment, a technician may find it more useful in trouble shooting the problem to receive one report saying that, for example, three-hundred endpoints have experienced the same impairment, as opposed to receiving three-hundred separate reports that all say their respective endpoint has experienced the same impairment. Furthermore, some embodiments allow for one or more of the throttling thresholds to be turned off. This may be advantageous where, for example, a technician wanted call specific alerts to be generated even though a throttling threshold number of quality-impacted calls had been detected.

The throttling threshold is based on the number of quality-impacted calls detected. In some embodiments manager 58 may consider only currently active calls when determining what throttling level to apply. Thus, as each user finishes their communication session (one that was quality-impacted) and terminates their call, the number of quality-impacted communication sessions goes down. In other embodiments manager 58 may consider both calls that are currently active and calls that were previously active but are now terminated. In those embodiments in which manager 58 includes terminated calls, it may limit the terminated calls to those that were terminated within a certain amount of time from the present.

As mentioned above, the extent of the throttling may be based on the current throttling level, where each level is separated by a throttling threshold that determines the number of quality-impacted calls that need to be detected before entering the next throttling level. The breakdown of the different throttling levels can best be seen through an illustrative example. The numbers used in the example are merely for illustrative purposes, CQMS 50 may use completely different numbers when put into actual use.

In this example assume CQMS 50 has been provisioned so that a non-throttled alert includes generating a metric report and initiating a consequent action. Further assume that an alert is generated if a quality-impacted call is detected and that a throttling scheme having three throttling levels is being used. Particular embodiments may use more or less throttling levels and may use different criteria in generating alerts. Also, for this example assume that the first throttling level has a throttling threshold of 100 quality-impacted calls, the second throttling level has a throttling threshold of 200 quality-impacted calls and the third throttling level has a throttling threshold of 1,000 quality-impacted calls. Accordingly, CQMS 50 may not apply any throttling if there are between 1 and 99 quality-impacted calls. However, CQMS 50 may apply throttling associated with the first throttling level if there are between 100 and 199 quality-impacted calls, it may apply throttling associated with the second throttling level if there are between 200 and 999 quality-impacted calls, and it may apply throttling associated with the third throttling level if there are 1,000 or more quality-impacted calls. Also associated with each throttling level is a grouping number that may be used to determine the number of quality-impacted calls that need to be detected between alerts. For example, if the second throttling level (with a throttling threshold of 200) has a grouping number of 100, then it may generate alerts upon detecting, for example, 200, 300 and 400 quality impacted-calls.

Initially CQMS 50 may not apply any throttling because the number of quality-impacted calls is within acceptable limits (e.g. less than 100). Thus, for each quality-impacted call that is detected an alert may be generated. The non-throttled alert may thus be call specific and may include a metric report and/or a consequent action. For example, the metric report could say that during call 'X' endpoint 72a experienced a low MOS score of 1.0. Furthermore, processor 54 may initiate a particular consequent action such as a layer 3 trace route may be initiated each time a quality-impacted call is detected.

The first throttling level, having a throttling threshold of 100, may have a grouping number of 10, thus CQMS 50 may generate an alert after every 10 additional quality-impacted calls detected after the first 100 quality-impacted calls are detected. Accordingly, in this example the first alert generated in the first throttling level may be sent when 100 quality-impacted calls are detected, then subsequent alerts in the first throttling level may be generated at intervals of 10 quality-impacted calls detected (e.g. 110, 120 etc.). The last alert generated in the first throttling level may be at 190 quality impacted calls because upon detecting 200 quality-impacted calls CQMS 50 may enter the second throttling level.

The types of alerts generated in the first throttling level may be similar to the alerts generated when no throttling was applied. However, the alerts of the first throttling level may include aggregated metric reports and/or consequent actions. The information in each aggregated metric report sent during the first throttling level may include a summary of those calls that were used to trigger generating the metric report (e.g. when second metric report is sent at 120 quality-impacted calls, it may summarize the impairment of the 120 calls). The summary may include such information as the average, maximum and/or minimum value of critical parameters being monitored with the metric and/or the number of active calls (or calls that recently terminated) that are below or above a predetermined threshold. Furthermore, the detail in the metric reports sent in the first throttling level may be less than the detail in a non-throttled metric report. For example, the metric report generated upon detecting 140 quality-impacted calls may say that 140 endpoints experienced a low MOS score with an average MOS score of 2.1. When the 141st quality-impacted call is detected, the monitored information may be stored within, for example memory 56, but may not be immediately used in a metric report. Rather, the information may be used in a subsequent metric report generated, for example, upon detecting 150 quality-impacted calls.

The second and third throttling levels may be similar to the first throttling level only there may be a larger gap between when alerts may be generated, and accordingly the alerts may include more quality-impacted calls. More specifically, the second throttling level may have a grouping number of 100, thus when CQMS 50 is in the second throttling level it may generate alerts at intervals of 100 quality-impacted calls. Accordingly, the first alert may be generated upon detecting 200 quality-impacted calls, the second alert may be generated at 300 quality-impacted calls, and each subsequent alert generated each time another 100 quality-impacted calls is detected until 1,000 quality-impacted calls are detected. The third throttling level may have a grouping number of 1,000. Accordingly, the first alert may be generated upon detecting 1,000 quality-impacted calls, the second alert may be generated at 2,000 quality-impacted calls, and each subsequent alert generated each time another 1,000 quality-impacted calls are detected.

Furthermore, the alerts sent in the second and third throttling levels may be similar to the alerts sent in the first throttling level; they may include aggregate metric reports and/or consequent actions. For example the aggregate metric report sent from the third throttling level may say that 2,000 calls have a low MOS score. When the 2,110th quality-impacted call is detected, the monitored information for that call may be stored, for example in memory 56, but it may not be immediately used in an aggregated metric report. Rather, the information may be used in a subsequent aggregate metric report generated in the third throttling level when, for example, 3,000 quality-impacted calls are detected.

In some embodiments, manager 58 may further associate a hysteresis number with each throttling threshold to prevent repeatedly switching back-and-forth between two levels. The hysteresis number may indicate how far below the throttling threshold the number of quality-impacted calls has to fall before dropping from the higher level to the lower level. For example, assume that the third throttling threshold (of the example above) has a hysteresis number of 150 associated with it. Further assume that CQMS 50 is presently in the second throttling level. In this situation CQMS 50 may remain in the second throttling level until the detected number of quality-impacted calls reaches 1,000. Once the number of quality-impacted calls reaches 1,000 then CQMS 50 may enter the third throttling level. These first two scenarios are the same whether or not hysteresis is used. It is not until the number of quality-impacted calls drops below 1,000, for example to 900, that things may be different depending on whether a hysteresis number is used. If there is no hysteresis number associated with the third throttling threshold then CQMS 50 may return to the second throttling level because the detected number of quality-impacted calls is less than the third throttling level. On the other hand, if a hysteresis number is associated with the third throttling threshold then CQMS 50 may remain in the third throttling level because the detected number of quality-impacted calls is not less than the third throttling threshold minus the hysteresis number (1000−150=850). Thus it would not be until the detected number of quality-impacted calls dropped below 850 (for example to 800) that CQMS 50 would return to the second throttling level.

A hysteresis number may be particularly useful in embodiments in which CQMS 50 counts the number of currently active quality-impacted calls to determine an appropriate throttling level. This is because during any given moment there may be several calls that are terminated or initiated.

It will be recognized by those of ordinary skill in the art that CQMS 50 is merely one example configuration of a CQMS for adapting media quality monitoring, in accordance with an embodiment of the present invention. Other CQMSs may include any number of interfaces, managers, processors, memory modules, and/or other components to accomplish the functionality and features described herein. For example, although CQMS 50 is illustrated and described as including interface 52, processor 54, memory module 56, and manager 58 these components and other desired components for performing the above described functionality may be centrally located (local) with respect to one another, or distributed throughout communication network 60.

Figure 3:
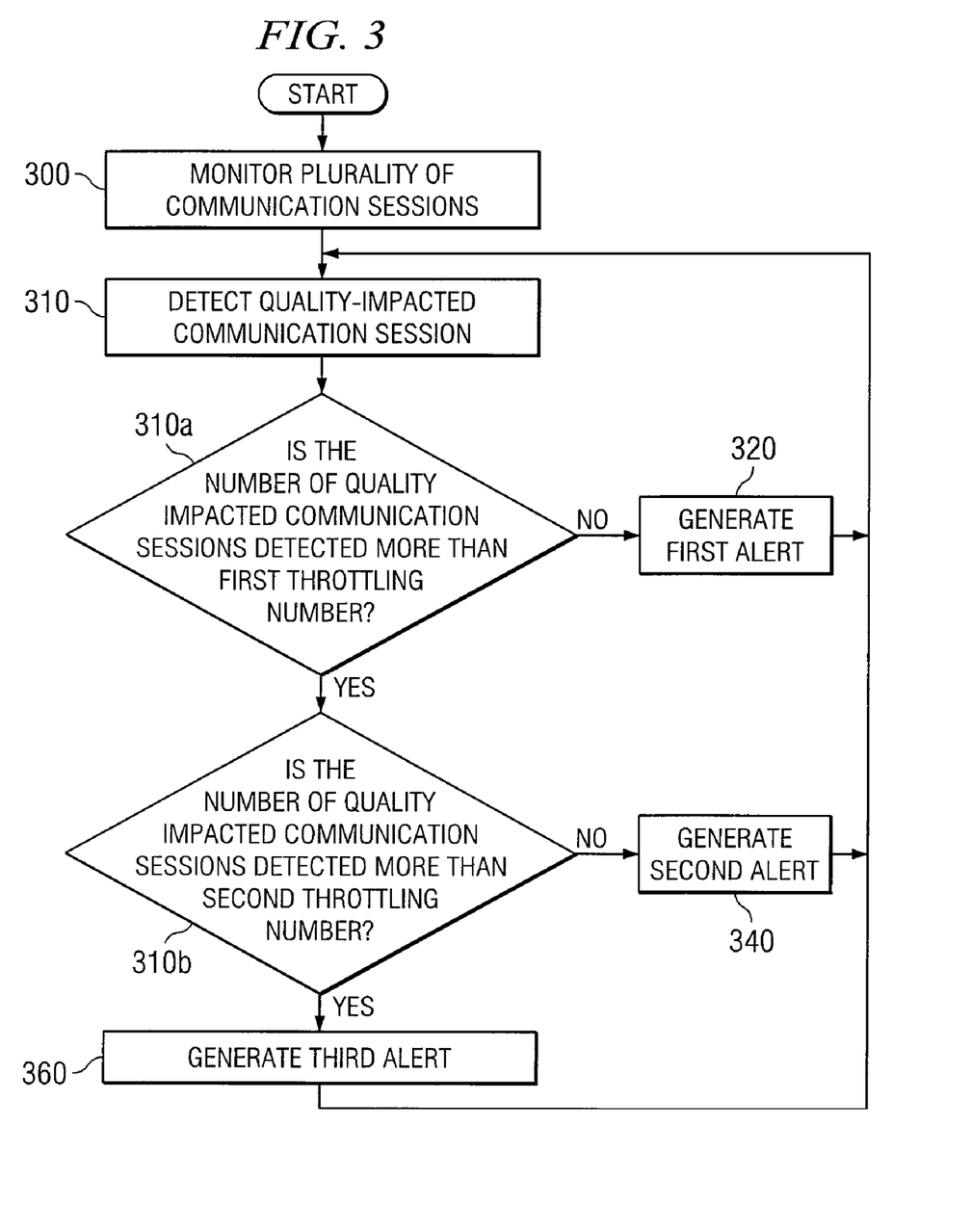
FIG. 3 illustrates a method for alert throttling in media quality monitoring, in accordance with an embodiment of the present invention.

FIG. 3 is a flowchart illustrating a method for alert throttling in media quality monitoring in accordance with an embodiment of the present invention. The method begins at step 300 where a plurality of active communication sessions are monitored. The active communication sessions may be monitored using metrics that ascertain the quality of a call by measuring, detecting, rating, comparing and/or otherwise analyzing different aspects of the call. Depending on the configuration of the device monitoring the call, the device may use more than one metric. Some of the possible types of metrics include packet loss metrics, delayed metrics, jitter metrics, echo metrics, signal level metrics, noise level metrics, failed connection metrics, end-to-end delay metrics, speech and silence metrics, concealed seconds metrics, and severely concealed seconds metrics.

These metrics may be used for any of a variety of purposes such as charting call quality performance, detecting quality-impacted calls or triggering consequent actions. Should a particular aspect of a call being monitored by a specific metric exceed a certain threshold, at step 310, a quality-impacted communication session may be detected.

If the number of quality-impacted communication sessions detected is less than a first throttling number then at step 320 a first alert may be generated. The first alert may include any of a number of consequent actions and/or metric reports. The specific alert that is generated may depend on the system or device that is monitoring the call and/or the impairment that is detected. Both the metric report and the consequent action of the first alert may be based on each individual quality-impacted communication session. Thus, each time a quality-impacted communication session is detected a metric report may be generated and a consequent action may be invoked.

Each first alert that is generated may comprise more than one action. For example, each time a quality-impacted communication session is detected multiple metric reports may be generated and/or consequent actions may be initiated.

A first alert may continue to be generated for each quality-impacted communication session until the number of quality-impacted communication sessions detected is more than a first throttling number and less than a second throttling number. The first throttling number of quality-impacted communication sessions may be set to reflect the point when the number of first alerts may begin to put an unwanted strain on a communication network. In some embodiments, the number of quality-impacted communication sessions may be based on the number of currently active communication sessions that have experienced some quality impairment. In some embodiments, the number of quality-impacted communication sessions may be based on both current communication sessions and communication sessions that have been terminated within a specific amount of time.

When the number of quality-impacted communication sessions detected is more than the first throttling number and less than the second throttling number a second alert may be generated. The second alert, generated at step 340, may include any of a number of aggregate metric reports or consequent actions. The specific second alert that is generated may depend on the system or device that is monitoring the call and/or the particular impairment that caused the call to become quality-impacted. Each aggregate consequent action and metric report for the second alert may be based on several calls. Thus, a second alert may not be generated each time a quality-impacted communication session is detected. Rather, a second alert may be generated, for example, for every ten quality-impacted calls that are detected. This reduces the demand on resources caused by generating an alert for each quality-impacted call that is detected. It should be noted that while the second alert may only be generated upon detecting a certain number of quality impacted calls, the information from each quality-impacted communication session may be stored so that it may be used by the second alert once the requisite number of quality-impacted calls has been detected. For example, a second alert, generated upon detecting 120 quality-impacted calls, may include a metric report based on information from the metrics used in monitoring the 120 quality-impacted calls. Because the second alert includes more endpoints, it may be less call specific than the first alert for individual calls, but it may provide more useful information about the network as a whole, such as the average, maximum and/or minimum value of critical parameters.

The first alert may again be generated should the detected number of quality impacted calls drop below the first throttling number. In those embodiments that use hysteresis, the detected number of quality impacted calls has to fall below the first throttling number of quality impacted calls minus the hysteresis number. The number of quality impacted calls may decrease in a variety of different situations, such as when there are more calls being terminated than initiated, or when the problem causing the impairment has been remedied.

If the number of quality-impacted communication sessions detected is more than the second throttling number then at step 360 a third alert is generated. The third alert is similar to the second alert except that it may be even less call-specific and it may be generated even less often than the second alert. For example, the third alert may be generated for every 100 quality-impacted calls that are detected. Because the third alert is being generated less often, and therefore includes more quality-impacted calls, it may further reduce the impact the alert has on the network's resources.

In some embodiments, only the first alert may comprise consequent actions. Thus, after the detected number of quality-impacted calls exceeds a first throttling number the consequent actions may stop, and only the aggregate metric reports may be generated.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments include methods and systems that enable a CQMS to throttle its call quality monitoring in response to detected impairments. This allows call specific alerts to be generated until a specific threshold of quality-impacted calls is detected. Upon detecting the threshold number of quality-impacted calls the alerts are throttled by aggregating information from several calls and spacing out the alerts; the alerts are spaced farther apart for larger numbers of quality-impacted calls. Thus, as the number of quality-impacted calls increases, precision in the alerts gives way to succinctly providing the bigger picture. The throttling also allows resources to not be overly strained when larger, system-wide impairments occur while still allowing for more detailed information to be provided via, for example, level one metric reports, when the system, in general, is operating properly and/or has sufficient resources to handle the calls, the metric reports and the consequent actions. As the impairment spreads and effects more calls the CQMS has the ability to throttle back the consequent actions to more efficiently utilize resources.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and CQMS 50, these elements may be combined, rearranged or positioned in order to accommodate particular routing architectures or needs. In addition, any of these elements may be provided as separate external components to communication system 30, CQMS 50 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for alert throttling in media quality monitoring, comprising:

monitoring at an interface, a plurality of active communication sessions, each active communication session between at least two endpoints;

detecting at an interface, at least one quality-impacted communication session out of the plurality of active communication sessions;

generating by a processor, a first alert for each detected quality-impacted communication session out of the plurality of active communication sessions until a first throttling number of quality-impacted communication sessions is detected out of the plurality of active communication sessions; and upon detecting the first throttling number of quality-impacted communication sessions generating by the processor, a second alert for each group of additional second number of quality-impacted communication sessions detected out of the plurality of active communication sessions.

2. The method of claim 1:
wherein generating a second alert for each group of additional second number of quality-impacted communication sessions detected comprises generating a second alert for each group of additional second number of quality-impacted communication sessions detected until a second throttling number of quality-impacted communication sessions is detected out of the plurality of active communication sessions; and
further comprising, upon detecting the second throttling number of quality-impacted communication sessions out of the plurality of active communication sessions, generating a third alert for each group of additional third number of quality-impacted communication sessions detected out of the plurality of active communication sessions.

3. The method of claim 1, wherein:
generating a first alert comprises performing a consequent action; and
generating a second alert comprises performing an aggregate consequent action.

4. The method of claim 1, wherein generating a first alert comprises generating a report comprising session-specific details of the at least one quality-impacted communication session.

5. The method of claim 1, wherein generating a second alert comprises generating a report comprising aggregate details of the second number of quality-impacted communication sessions.

6. The method of claim 1, further comprising, after generating second alerts for each group of additional second number of quality-impacted communication sessions detected, generating a first alert for each detected quality-impacted communication session out of the plurality of active communication sessions when a number of quality-impacted communication sessions detected out of the plurality of active communication sessions is equal to or less than a hysteresis number, the hysteresis number less than the first throttling number.

7. A system for alert throttling in media quality monitoring, comprising:
an interface operable to:
monitor a plurality of active communication sessions, each active communication session between at least two endpoints; and
detect at least one quality-impacted communication session out of the plurality of active communication sessions; and
a processor coupled to the interface and operable to:
generate a first alert for each detected quality-impacted communication session out of the plurality of communication sessions until a first throttling number of quality-impacted communication sessions is detected out of the plurality of active communication sessions; and
upon detecting the first throttling number of quality-impacted communication sessions, generate a second alert for each group of additional second number of quality-impacted communication sessions detected out of the plurality of active communication sessions.

8. The system of claim 7, wherein:
the processor operable to generate a second alert for each group of additional second number of quality-impacted communication sessions detected comprises a processor operable to generate a second alert for each group of additional second number of quality-impacted communication sessions detected until a second throttling number of quality-impacted communication sessions is detected out of the plurality of active communication sessions; and
the processor is further operable to, upon detecting the second throttling number of quality-impacted communication sessions out of the plurality of active communication sessions, generate a third alert for each group of additional third number of quality-impacted communication sessions detected out of the plurality of active communication sessions.

9. The system of claim 7, wherein the processor operable to:
generate a first alert comprises a processor operable to perform a consequent action; and
generate a second alert comprises a processor operable to perform an aggregate consequent action.

10. The system of claim 7, wherein the processor operable to generate a first alert comprises a processor operable to generate a report comprising session-specific details of the at least one quality-impacted communication session.

11. The system of claim 7, wherein the processor operable to generate a second alert comprises a processor operable to generate a report comprising aggregate details of the second number of quality-impacted communication sessions.

12. The system of claim 7, wherein the processor is further operable to, after generating second alerts for each group of additional second number of quality-impacted communication sessions detected, generate a first alert for each detected quality-impacted communication session out of the plurality of active communication sessions detected when a number of quality-impacted communication sessions detected out of the plurality of active communication sessions is equal to or less than a hysteresis number, the hysteresis number less than the first throttling number.

13. A computer readable medium encoded with computer software, executed by a processor to perform steps to:
monitor at an interface, a plurality of active communication sessions, each active communication session between at least two endpoints; detect at an interface, at least one quality-impacted communication session out of the plurality of active communication sessions; generate by the processor, a first alert for each detected quality-impacted communication session out of the plurality of active communication sessions until a first throttling number of quality-impacted communication sessions is detected out of the plurality of active communication sessions; and upon detecting the first throttling number of quality-impacted communication sessions, generate by the processor, a second alert for each group of additional second number of quality-impacted communication sessions detected out of the plurality of active communication sessions.

14. The computer software executed by the processor of claim 13, further comprising steps to:
generate a second alert for each group of additional second number of quality-impacted communication sessions detected until a second throttling number of quality-impacted communication sessions is detected out of the plurality of active communication sessions; and upon detecting the second throttling number of quality-impacted communication sessions out of the plurality of active communication sessions, generate a third alert for each group of additional third number of quality-impacted communication sessions detected out of the plurality of active communication sessions.

15. The computer software executed by the processor of claim 13, further comprising steps to: generate a first alert to perform a consequent action; and generate a second alert to perform an aggregate consequent action.

16. The computer software executed by the processor of claim 13, further comprising steps to: generate a first alert, and to generate a report comprising session-specific details of the at least one quality-impacted communication session.

17. The computer software executed by the processor of claim 13, further comprising steps to: generate a second alert, and to generate a report comprising aggregate details of the second number of quality-impacted communication sessions.

18. The computer software executed by the processor of claim 13, further comprising steps to: after generating second alerts for each group of additional second number of quality-impacted communication sessions detected, generate a first alert for each detected quality-impacted communication session out of the plurality of active communication sessions when a number of quality-impacted communication sessions detected out of the plurality of active communication sessions is equal to or less than a hysteresis number, the hysteresis number less than the first throttling number.

19. A system for alert throttling in media quality monitoring, comprising:
- means for monitoring a plurality of active communication sessions, each active communication session between at least two endpoints;
- means for detecting at least one quality-impacted communication session out of the plurality of active communication sessions;
- means for generating a first alert for each detected quality-impacted communication session out of the plurality of active communication sessions until a first throttling number of quality-impacted communication sessions is detected out of the plurality of active communication sessions; and
- means for upon detecting the first throttling number of quality-impacted communication sessions, generating a second alert for each group of additional second number of quality-impacted communication sessions detected out of the plurality of active communication sessions.

* * * * *

UNITED STATES PATENT AND TRADEMARK OFFICE
CERTIFICATE OF CORRECTION

PATENT NO. : 7,606,149 B2
APPLICATION NO. : 11/379312
DATED : October 20, 2009
INVENTOR(S) : Kumar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 494 days.

Signed and Sealed this

Fifth Day of October, 2010

David J. Kappos
*Director of the United States Patent and Trademark Office*